US011273372B2

(12) United States Patent
Sarugaku et al.

(10) Patent No.: US 11,273,372 B2
(45) Date of Patent: Mar. 15, 2022

(54) SERVER DEVICE AND STORAGE MEDIUM FOR USE THEREWITH

(71) Applicant: KONAMI DIGITAL ENTERTAINMENT CO., LTD., Tokyo (JP)

(72) Inventors: Kazunari Sarugaku, Tokyo (JP); Tomoaki Miyagawa, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 181 days.

(21) Appl. No.: 16/662,215

(22) Filed: Oct. 24, 2019

(65) Prior Publication Data

US 2020/0054945 A1 Feb. 20, 2020

Related U.S. Application Data

(63) Continuation of application No. PCT/JP2018/016214, filed on Apr. 19, 2018.

(30) Foreign Application Priority Data

Apr. 28, 2017 (JP) .............................. JP2017-089999

(51) Int. Cl.
*A63F 13/35* (2014.01)
*H04N 21/231* (2011.01)
(Continued)

(52) U.S. Cl.
CPC ........... *A63F 13/35* (2014.09); *H04N 21/231* (2013.01); *H04N 21/234* (2013.01);
(Continued)

(58) Field of Classification Search
CPC .. H04N 21/231; H04N 21/234; H04N 21/235; H04N 21/44; H04N 21/4781;
(Continued)

(56) References Cited

U.S. PATENT DOCUMENTS 8,363,102 B1* 1/2013 Kadoch .................... H04N 7/18
348/148
8,893,164 B1* 11/2014 Teller .................. G06Q 30/0269
725/12

(Continued)

FOREIGN PATENT DOCUMENTS

JP 2012-4991 A 1/2012
JP 2012-15990 A 1/2012
(Continued)

OTHER PUBLICATIONS

International Search Report dated Jul. 17, 2018 issued by the International Searching Authority in International Application No. PCT/JP2018/016214.

(Continued)

*Primary Examiner* — Michael B. Pierorazio
(74) *Attorney, Agent, or Firm* — Sughrue Mion, PLLC

(57) ABSTRACT

Provided is a server device that when, during viewing of a video, viewing conditions for changing states of displayed objects included in the video are changed according to selection by the user, is capable of suppressing display of comments that do not match the viewing conditions of the video. A center server delivers, to a user terminal, replay data for displaying a replay video of which viewing conditions are changed during viewing in accordance with the selection by each user. The center server has a storage unit storing comment data including information about a stamp attached to the replay video and information about the viewing condition under which the replay video should be displayed. The center server, when delivering the replay data, provides the user terminal with the comment data so that the stamp displayed in the replay video is changed in accordance with change of the viewing condition.

12 Claims, 8 Drawing Sheets

(51) Int. Cl.
*H04N 21/234* (2011.01)
*H04N 21/235* (2011.01)
*H04N 21/44* (2011.01)
*H04N 21/478* (2011.01)
*H04N 21/488* (2011.01)

(52) U.S. Cl.
CPC ........... *H04N 21/235* (2013.01); *H04N 21/44* (2013.01); *H04N 21/4781* (2013.01); *H04N 21/4882* (2013.01)

(58) Field of Classification Search
CPC ........... H04N 21/4882; H04N 21/4788; H04N 21/84; H04N 21/2353; H04N 21/47205; H04N 21/238; H04N 21/2743; H04N 21/4312
See application file for complete search history.

(56) References Cited

U.S. PATENT DOCUMENTS

| | | | |
|---|---|---|---|
| 2007/0162487 A1* | 7/2007 | Frailey | H04N 7/165 |
| 2009/0087161 A1* | 4/2009 | Roberts | G11B 27/10 |
| | | | 386/282 |
| 2009/0148124 A1* | 6/2009 | Athsani | H04N 21/84 |
| | | | 386/241 |
| 2009/0204885 A1* | 8/2009 | Ellsworth | G06F 16/44 |
| | | | 715/234 |
| 2010/0002084 A1* | 1/2010 | Hattori | H04N 5/23212 |
| | | | 348/207.1 |
| 2010/0075685 A1* | 3/2010 | Axnas | H04W 72/02 |
| | | | 455/450 |
| 2010/0254295 A1* | 10/2010 | Ahn | H04N 21/6131 |
| | | | 370/312 |
| 2012/0020307 A1* | 1/2012 | Henderson | H04W 74/085 |
| | | | 370/329 |
| 2012/0040714 A1* | 2/2012 | Wu | H04B 1/3877 |
| | | | 455/552.1 |
| 2012/0075168 A1* | 3/2012 | Osterhout | G06F 3/011 |
| | | | 345/8 |
| 2012/0192242 A1* | 7/2012 | Kellerer | G06F 16/7867 |
| | | | 725/116 |
| 2012/0229655 A1* | 9/2012 | Solomon | H04N 5/23225 |
| | | | 348/207.1 |
| 2013/0104173 A1* | 4/2013 | Tjio | H04H 20/55 |
| | | | 725/62 |
| 2014/0157336 A1* | 6/2014 | Deegan | H04N 21/4782 |
| | | | 725/91 |
| 2018/0103291 A1* | 4/2018 | Gefen | H04N 21/44016 |

FOREIGN PATENT DOCUMENTS

| | | |
|---|---|---|
| JP | 2015-142207 A | 8/2015 |
| JP | 2016-123069 A | 7/2016 |
| JP | 2016-189804 A | 11/2016 |
| JP | 201741780 A | 2/2017 |
| KR | 1020140093970 A | 7/2014 |
| WO | 2017/029918 A1 | 2/2017 |

OTHER PUBLICATIONS

Written Opinion dated Jul. 17, 2018 issued by the International Searching Authority in International Application No. PCT/JP2018/016214.
Notice of Reasons for Refusal dated Oct. 4, 2017, issued by the Japanese Patent Office in Application No. 2017-089999.
Decision to Grant a Patent dated Mar. 7, 2018, issued by the Japanese Patent Office in Application No. 2017-089999.
Communication dated Jan. 8, 2021, from the Korean Intellectual Property Office in application No. 10-2019-7031599.
Communication dated May 6, 2021 from The State Intellectual Property Office of P.R. of China in English Application No. 201880027844.1.

* cited by examiner

SERVER DEVICE AND STORAGE MEDIUM FOR USE THEREWITH

TECHNICAL FIELD

The present invention relates to a server device and so on including a video data storage unit that stores video data for displaying videos, that, when video display terminals that display videos on the basis of video data are connected thereto via a network, delivers video data to the video display terminals according to requests from the video display terminals.

BACKGROUND ART

There is a server device including a video data storage unit that stores video data for displaying videos, and that, when video display terminals that display videos on the basis of video data are connected thereto via a network, delivers video data to the video display terminals according to requests from the video display terminals. For example a video delivery system is known (for example, refer to PTL1) that employs program contents as videos, and that determines and records evaluations by viewers relating to the program contents on the basis of video photography of the viewers who are viewing the program contents.

CITATION LIST

Patent Literature

PTL1: JP2015-142207A.

SUMMARY OF INVENTION

Technical Problem

With the system of PTL1, program contents are distributed as videos. However, program contents of this type are limited to displaying the results of broadcasting just as they are, and the intentions of the user such as selection of the contents displayed and so on are not reflected. In other words, the sizes and the display angles of objects included in the program contents are fixed just as they are at the time of broadcasting, and there is no room for them to be changed according to selection or the like by the user. On the other hand, sometimes comments by users are attached to videos of this type that are the subjects of distribution. Furthermore, there are also some videos in which the sizes and so on of objects included in the videos change according to selection by the user. For example, a replay video that replays game play in the past is known as a video of this type. In a video of this type, sometimes a different impression is given to the viewer due to the size and/or the display angle of an object, even if the scene is the same. Due to this, if comments are displayed uniformly without giving any consideration to factors such as viewing angle and so on, then there is a possibility that a situation will arise in which a comment is not appropriate (for example, it may have a different effect from that intended by the person who added the comment). And there is a possibility that inappropriate comments of this type may reduce the appeal of the video.

Accordingly, an object of the present invention is to provide a server device and so on that when, during viewing of a video, viewing conditions for changing states of displayed objects included in the video are changed according to selection by the user, is capable of suppressing display of comments that do not match the viewing conditions of the video being viewed.

Solution to Technical Problem

The server device of the present invention is a server device that comprises a computer having a video data storage unit that stores video data for displaying videos, and that, when a video display terminal that displays a video on the basis of the video data is connected via a network, delivers the video data to the video display terminal according to a request by the video display terminal, and wherein the computer serves as: a comment data storage unit that, if the video data is structured so that viewing conditions for changing display state of an object included in the video are changed during viewing of the video according to selection by each user, stores comment data in which information specifying comments attached to the video by users and information specifying the viewing conditions according to which the comments are to be displayed are described in mutual association; and a data supply unit that, when the video data is delivered, supplies to the video display terminal the comment data including information specifying the comments corresponding to the viewing conditions for the video at the time of viewing, so that the comments displayed in the video are changed over according to change of the viewing conditions.

On the other hand, a non-transitory computer readable storage medium of the present invention is a non-transitory computer readable storage medium storing a computer program that is adapted to cause the computer having the video data storage unit and the comment data storage unit to function as the units of the server device described above.

DESCRIPTION OF EMBODIMENTS

Figure 1:
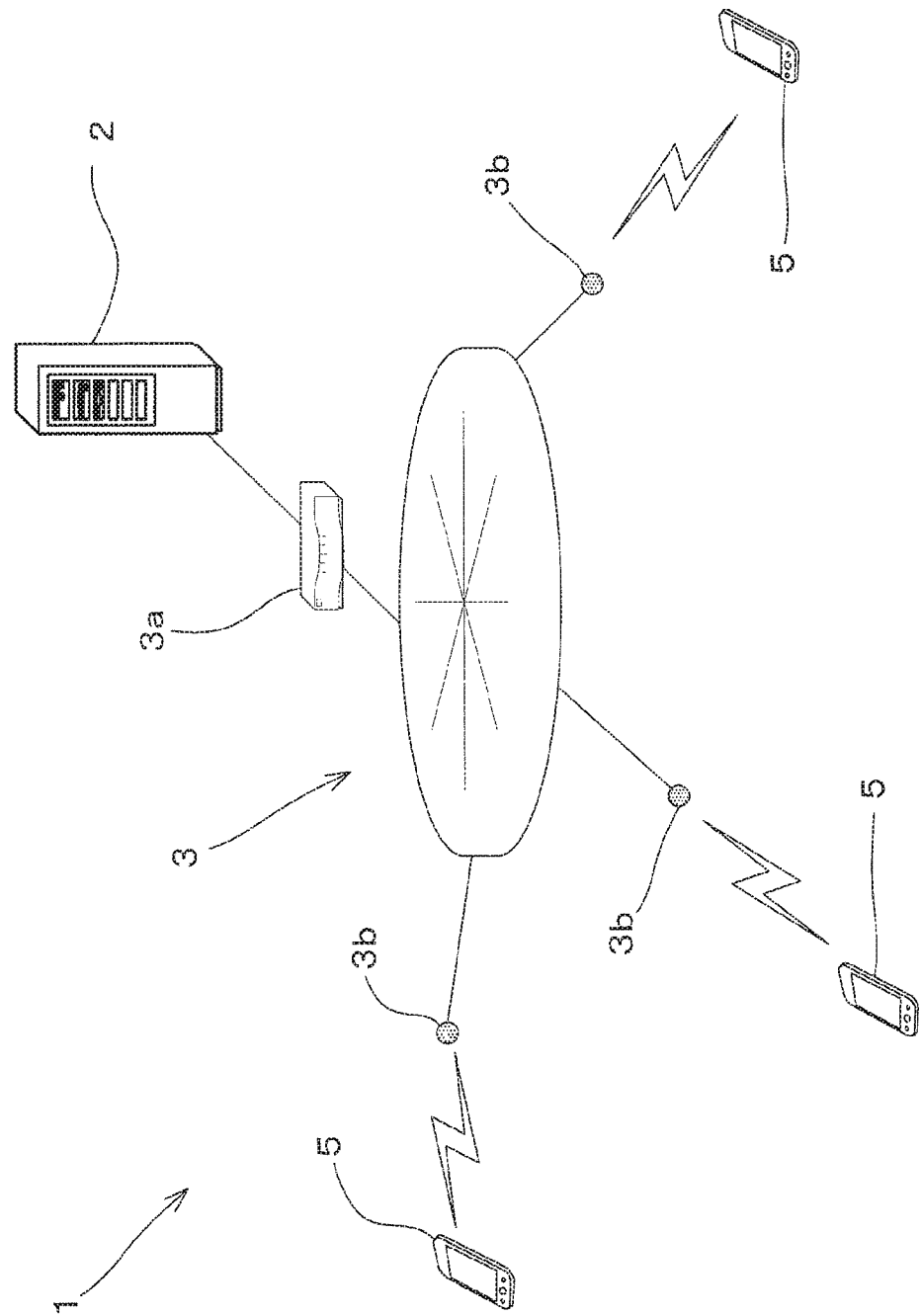
FIG. 1 is a figure showing a summary of the overall structure of a video delivery system according to an embodiment of the present invention.

In the following, a video delivery system according to an embodiment of the present invention will be explained. FIG. 1 is a figure showing a summary of the overall structure of a video delivery system according to an embodiment of the present invention. As shown in FIG. 1, the video delivery system 1 includes a center server 2, which operates as a server device. The center server 2 is not limited to being an example consisting of a single physical device. For example, a single logical center server 2 may be constituted by a server group consisting of a plurality of physical devices. Moreover, the center server could also be constructed logically by employing cloud computing.

User terminals 5 are connected to the center server 2 via a network 3. The user terminals 5 are network terminal devices of types that are employed by users. For example, a portable telephone (including a smartphone) may be employed as a user terminal 5. A portable telephone is a type of user terminal that is provided for the individual personal use of a user. For example, a portable telephone may have a video replay function of displaying (i.e. of replaying) video. And a portable telephone may, for example, function as a video display terminal for displaying video via this type of video replay function. Moreover, a portable telephone may provide various other functions by executing software. For example, one such function may be a game machine function that enables the user to play a game. And a portable telephone may, for example, function as a game terminal that provides a game via a game machine function of this type. In other words, the user terminal 5 may, for example, function both as a video display terminal and as a game terminal. Incidentally, apart from the above, for example, network terminal devices of various types such as personal computers and portable type tablet terminal devices that can be connected to a network and that are provided for individual personal use of users may be employed as user terminals 5.

As one example, the network 3 may be configured to implement network communication by employing the TCP/IP protocol. Typically, the network 3 is built as a combination of the internet that serves as a WAN and an intranet that serves as a LAN. In the example of FIG. 1, the center server 2 is connected to the network 3 via a router 3a, and the user terminals 5 are connected to the network 3 via access points 3b.

Incidentally, the format of the network 3 is not limited to employment of the TCP/IP protocol. Systems of various types may be employed for the network 3, such as cabled communication circuits, wireless circuits (such as infrared communication or Near Field Communication, etc.), and so on.

Via the network 3, the center server 2 provides web services of various types to the users of the user terminals 5. A video delivery service for delivering videos to the user terminals 5 is included in the web services. Furthermore, a comment attachment service for users to attach comments to videos delivered via the video delivery service is included in the web services. For example, such a comment attachment service may be supplied as a part of the video delivery service. The details of the comment attachment service will be described hereinafter.

Incidentally, apart from the above, according to the functions of the user terminals 5, the web service may include other services of various types. For example, the web service may include an information service of providing information of various types related to videos or to games. And, for example, the web service may also include a distribution service of distributing data or software of various types to the user terminals 5 (including data updates and so on). Yet further, the web service may also include a community service of providing a place for transmission, exchange, sharing and so on of information by users, a service of assigning user IDs for identifying users, a matching service of matching between users when a plurality of users are playing a common game via the network 3, and so on.

Figure 2:
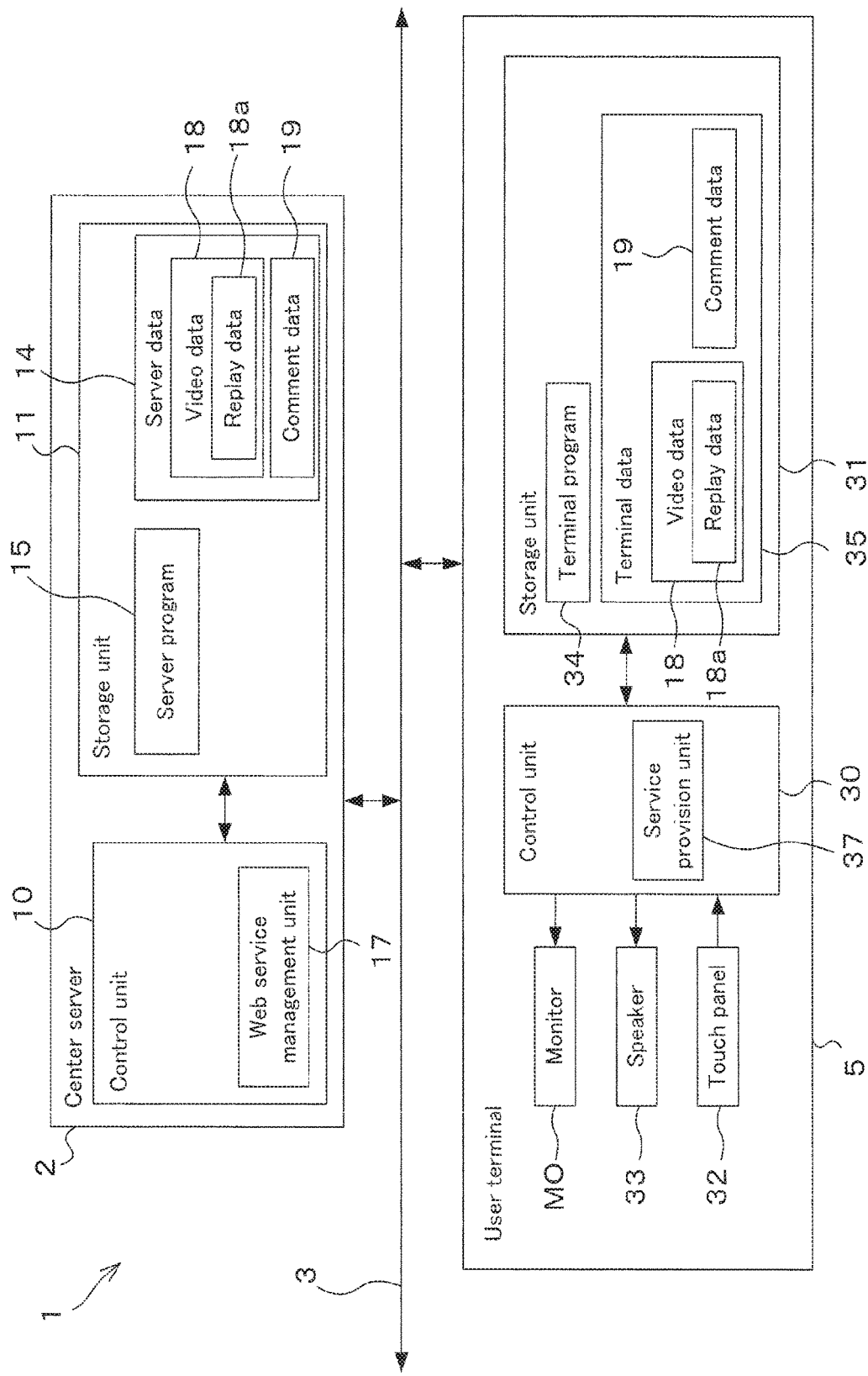
FIG. 2 is a figure showing the structure of principal portions of a control system of the video delivery system.

Next, principal portions of a control system of the video delivery system 1 will be explained. FIG. 2 is a figure showing the structure of principal portions of the control system of the video delivery system 1. As shown in FIG. 2, the center server 2 includes a control unit 10 which is embodied as a computer, and a storage unit 11. The control unit 10 is built as a computer unit in which are combined a microprocessor and peripheral devices of various types required for the operation of the microprocessor, such as internal storage devices (for example, a ROM and a RAM) and so on. Incidentally, input devices such as a keyboard and so on, and output devices such as a monitor and so on, may be connected to the control unit 10. However, these are not shown in the figures.

The storage unit 11 is connected to the control unit 10. The storage unit 11 may be built so as to be capable of maintaining storage even without supply of power, for example around a high capacity storage medium such as a magnetic tape or the like. Server data 14 and a server program 15 are stored in the storage unit 11. The server program 15 is a computer program that is required by the center server 2 for supplying services of various types to the user terminals 5. By the control unit 10 reading in and executing the server program 15, a web service management unit 17 is provided internally to the control unit 10.

The web service management unit 17 performs processing that is required for providing the web service mentioned above. The web service management unit 17 is a logical device that is implemented by a combination of computer hardware and a computer program. Moreover, apart from the above, logical devices of various other types may be provided internally to the control unit 10. However, such other devices are not shown in the figures.

The server data 14 is data that is referred to during execution of the server program 15. For example, the server data 14 may include video data 18 and comment data 19. The comment data 19 is data for managing comments that are attached to the videos. The details of the comment data 19 will be described hereinafter.

On the other hand, the video data 18 is data for displaying videos of various types. For example, videos associated with games (sometimes hereinafter these are referred to as "game videos") may be included in these videos of various types. In more concrete terms, for example, the video data 18 may include data provided by the user terminals 5 for displaying, as videos, transitions of the game screen during playing of games in the past. For example, video data 18 including replay data 18a may be included as data of this sort. In other words, the video data 18 may also function as replay data 18a.

The replay data 18a is data for recreating (i.e. for replaying) game play in the past (hereinafter, a video based upon replay data 18a in a game video is sometimes referred to as a "replay video"). A replay video is a video with which viewers are capable of interfering with the viewing conditions in order to change the states of displayed objects in the video. In other words, with a replay video, viewing conditions of this type can be changed according to selection by the user. In more concrete terms, for example, with a replay video, if a game screen is drawn on the basis of the result of photography by a virtual camera of a virtual three dimensional space in the game, then, as a viewing condition, the angle of field of the virtual camera may be changed in order to perform photography so as to enlarge or reduce objects in this virtual three dimensional space. Alternatively, as viewing conditions, the direction of photography (or the photographic angle) by a virtual camera of this type, or the position in which it is placed may be changed, so that the angles or the positions of displayed objects change. In other words, in a replay video, the viewing conditions may be taken advantage of for changing the display state, such as the sizes, the display angles (for example, for performing video photography, the angle subtended between the direction of photography of the virtual camera and the target object), and/or the positions.

Incidentally, and the server data 14 may include data of various types for web services. For example, apart from the above, as one type of such data, the server data 14 may, for example, include ID management data for managing IDs of various types such as user IDs and so on. Moreover, for example, if the user terminal 5 is functioning as a game terminal, then the server data 14 may include play data for handing over unique information for each user, such as information specifying activity records related to the game and so on, including the results of playing the game in previous playing episodes up to the last (i.e. states of play in past games) to the next and subsequent playing episodes. However, such data is not shown in the figures.

On the other hand, each of the user terminals 5 is provided with a control unit 30, a storage unit 31, a monitor MO, a touch panel 32, and a speaker 33. The storage unit 31, the monitor MO, the touch panel 32, and the speaker 33 are all connected to the control unit 30. The control unit 30 is constructed as a computer unit in which a microprocessor and various peripheral devices such as internal storage devices (for example ROM and RAM) and so on that are required for the operation of this microprocessor are combined. Incidentally, apart from the above, for example, devices of various types that are required for replaying videos or providing games may be connected to the control unit 30. However, these are not shown in the figures.

The monitor MO is a conventionally known display device for displaying images of various types and so on based upon output signals from the control unit 30. As one example, according to output signals from the control unit 30, the monitor MO may display a comment screen for attaching a comment to a video. The touch panel 32 is a conventionally known input device that, when the user touches it with his or her finger or the like, outputs a signal corresponding to the position where it is being contacted. The touch panel 32 may, for example, be built to be transparent, and may be disposed by being superimposed upon the front surface of the monitor MO. And, on the basis of touch operation by the user, the touch panel 32 outputs a signal corresponding to the position where it is being touched to the control unit 30. In a similar manner, the speaker 33 is a conventionally known output device (i.e. an audio reproduction device) for reproducing audio of various types on the basis of output signals from the control unit 30. The speaker 33 reproduces audio of various types employed in videos or games, such as BGM (background music) and so on, according to output signals from the control unit 30.

On the other hand, the storage unit 31 may be built so as to be capable of maintaining storage even without supply of power; for example, it may be built around a magnetic recording medium, an optical recording medium, a flash SSD (Solid State Drive), or the like. A terminal program 34 and terminal data 35 are stored in the storage unit 31. The terminal program is a computer program that is required by the user terminal 5 for providing services of various types. For example, services of this sort may include replaying of videos and provision of games. A service provision unit 37 is provided internally to the control unit 30 by the control unit 30 executing the terminal program 34. The service provision unit 37 executes processing of various types required for provision of services such as replaying of videos, playing of games, and so on. The service provision unit 37 is a logical device that is implemented by a combination of computer hardware and a computer program. Incidentally, apart from the above, various logical devices of other types may be provided internally to the control unit 30. However, such other devices are not shown in the figures.

The terminal data 35 is data that is referred to as the terminal program 34 is executed. For example, the terminal data 35 may include the video data 18 that includes the replay data 18a, and the comment data 19. And, for example, at least parts of this data may be supplied from the center server 2, so as to include necessary portions thereof. Incidentally, apart from the above, the terminal data 35 may include data of various types for executing services of various types. For example, audio data for replaying audio of various types such as BGM (background music) or the like required for videos or for games, image data for displaying images of various types required for games, and ID management data such as described above, may be included in data of this type. However, such other data is not shown in the figures.

Next, the details of the comment attachment service provided by the video delivery system 1 will be explained. As described above, the comment attachment service is a service for attaching comments by users (including various expressions such as characters and symbols) to videos. In the case of a replay video, the comments are managed in association with the viewing conditions, so that the comments displayed are changed over according to the viewing conditions during video via the video delivery service. Moreover, a comment of this type may, for example, be managed by the center server 2 so that the comment is attached even when each video is being viewed by some other user. Alternatively, a comment of this type may be attached only during viewing by the user who has attached it. In this case, the information in a comment of this type may be managed by the user terminal 5. In other words, this type of comment information need not be transmitted to the center server 2.

Figure 3:
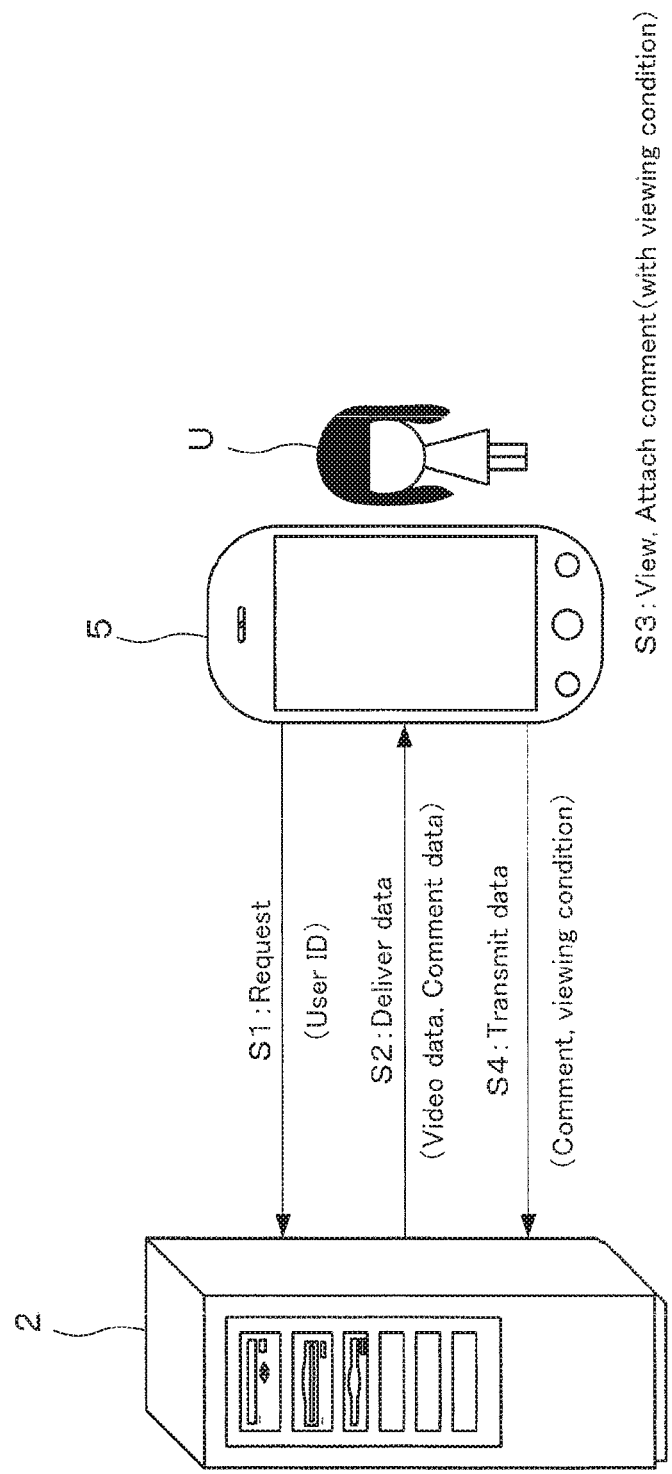
FIG. 3 is an explanatory figure for explanation of a summary of an example of a comment attachment service.

FIG. 3 is an explanatory figure for explanation of a summary of an example of the comment attachment service, when comments are attached to replay videos so as to be shared in common with other users. Furthermore, the example of FIG. 3 shows a case in which comments by users are attached during viewing of videos. In this case, as shown in FIG. 3, in the comment attachment service, when a replay video delivered via the center server 2 is being viewed via the user terminals 5, the comment is attached with viewing conditions appended. And information specifying the comment with viewing conditions of this type appended is transmitted to the center server 2, so as to be shared in common with the other user terminals 5. In other words, comments that are attached by each of the users U are transmitted to the center server 2, so as to be attached to the replay video as it is being viewed by other users U upon other user terminals 5, under same viewing conditions. To put it differently, the comments are also displayed in the replay video as it is being viewed by other users U upon other user terminals 5, while being changed over (varied) according to changes of the viewing conditions.

In concrete terms, in the comment attachment service, first, a user terminal 5 requests the center server 2 for a video to be the subject of delivery (S1). Moreover, this request is formulated so as to include a user ID, in order to identify the person making the request. For example, the user terminal 5 may make a request of this sort via a video application (software) for implementing the video replay function. Furthermore, for example, a game application for providing a game machine function (hereinafter sometimes termed a "game application") may be employed as a video application of this type. In other words, in the comment attachment service, via a game application that has a video replay function, a request is made to the center server 2 from a user terminal 5 for the subject to be delivered. And, if a game application of this type is employed, the replay data 18a in the video data 18 may be delivered as the subject for delivery. Even further, a game application of this type may request a user ID for use in the request for delivery or in the application. And, via a game application of this sort, the user terminal 5 may request a replay video from the center server 2, so as to include the user ID corresponding to the user U who is the person making the request. If a game application of this type is employed, then the user terminal 5 functions both as the video display terminal of the present invention and as the game terminal of the present invention.

Next, in response to the request from the user terminal 5, the center server 2 delivers the data that is to be the subject of delivery to the user terminal 5 (S2). The data that is to be the subject of delivery includes the video data 18 for displaying the video that is the subject of the request, and also the comment data 19. In more concrete terms, the center server 2 transmits the replay data 18a corresponding to the replay video that is the subject of the request and the comment data 19 that manages the comments to be attached to that replay video to the user terminal 5 as data for the subject to be delivered.

And next, on the basis of the replay data 18a and the comment data 19 that have been received from the center server 2, the user terminal 5 displays the replay video with the comment attached thereto, and also provides each user U with an attachment opportunity for attaching an additional comment to that replay video (S3). For example, the user terminal 5 may provide an attachment opportunity of this type while the video is being viewed. Moreover, in this attachment opportunity, the comments are managed so as to correspond to the viewing conditions. For example, viewing conditions of this type may be set on the basis of commands by the user. In concrete terms, each comment may be associated with the viewing conditions when the comment was inputted, so that input of a comment also functions as a specification of its viewing conditions. In other words, the attachment opportunities are adapted to manage the comments in association with the viewing conditions when they were inputted.

Moreover, the user terminal 5 transmits to the center server 2 data for displaying the comments with viewing conditions appended that have been attached by the users U to the replay video (S4). In other words, in order to display comments that have been inserted by other users U along with viewing the same video according to their viewing conditions, the user terminal 5 transmits data to the center server 2 for attaching the comments of those users U. In concrete terms, if each comment is associated with the viewing conditions when that comment was inputted, then the user terminal 5 transmits data to the center server 2, so as to include the comment inputted by the user U and also information describing the viewing conditions when that comment was inputted. For example, information of this sort describing comments and their viewing conditions may be managed with the comment data 19. In this case, as information of this type, the user terminals 5 may generate (or update) comment data 19 including this information, and may transmit it to the center server 2. For example, if a replay video is the subject, then the comment attachment service may be provided in this manner.

Incidentally, comments attached by each of the users U may be added even when there is another user U who is viewing the same replay video at the same time, so as to be reflected in that video at the right opportunity. Alternatively, comments of this type may be attached to the replay video when the replay video is being viewed the next and subsequent times.

Next, an example of an attachment opportunity that is provided by the process S3 described above will be explained. A comment may be inputted via an input device of various types, such as via a keyboard or by audio or the like. Moreover, a comment may be inputted freely, or may be selected from a plurality of comment candidates that have been prepared in advance. In a similar manner, a comment may be disposed at any appropriate location, provided that it is associated with the video. For example, it may be placed in a region that is different from the video display region, or may be displayed in the video display region. And attachment opportunities may be provided as appropriate to match these various formats. In concrete terms, for example, an attachment opportunity may be provided via a comment screen that is displayed upon the monitor MO of the user terminal 5. Moreover, the user terminal 5 may provide a comment screen of this type via, for example, a game application.

Figure 4:
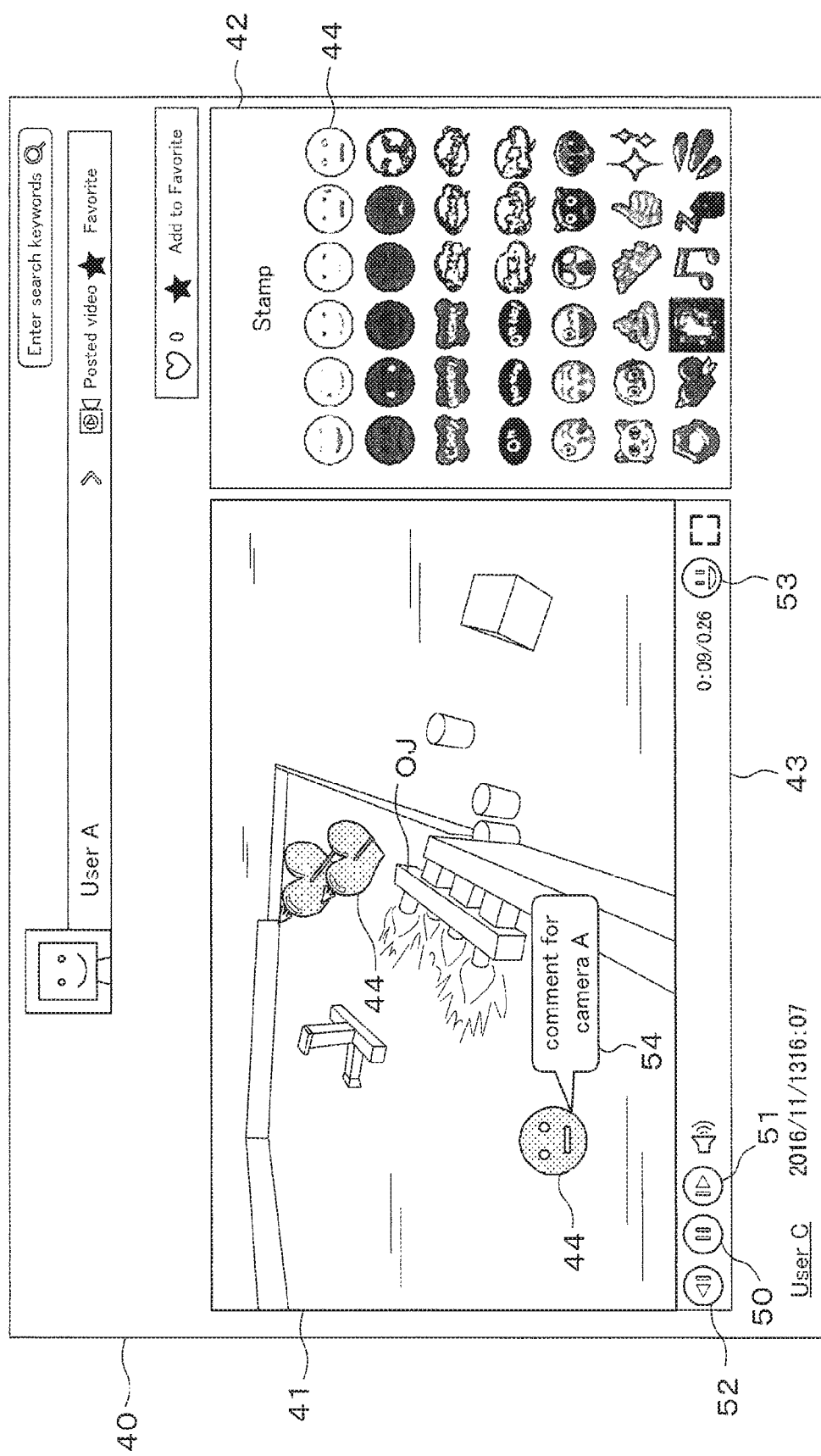
FIG. 4 is a figure schematically showing an example of a comment screen.

FIG. 4 is a figure schematically showing an example of a comment screen for attaching a comment to a replay video. In this case, as shown in FIG. 4, the comment screen 40 includes a video screen 41, a comment candidate region 42, and a viewing control region 43. The comment candidate region 42 is a region for displaying a plurality of comment candidates that have been prepared in advance. Each of the comment candidates in the comment candidate region 42 functions as an option for selecting a comment to be attached to the replay video. For example, as comment candidates of this type, a plurality of stamps 44 may be displayed in the comment candidate region 42, and may function as emoticons corresponding to expression of emotions of various kinds and so on. And, via designation by each user U, any one of these stamps 44 may be selectively employed.

The video screen 41 is a region for displaying (i.e. viewing) the replay video. The replay video includes an object image OJ corresponding to an object of some type that appears in the video. Due to this, the object image OJ is displayed upon the video screen 41. Moreover, stamps 44 that have been attached by various users U are also displayed as appropriate upon the video screen 41. Each of the stamps 44 is displayed in association with viewing conditions for the replay video. Due to this, if the viewing conditions for the replay video are changed, then the stamps 44 that are displayed upon the video screen 41 also change. In more concrete terms, for example, when the results of photography by a plurality of virtual cameras are employed as viewing conditions in a replay video based upon the result of photography by those virtual cameras, then, along with the virtual camera changing over, the details of the stamps 44 displayed change, even though the scene of the replay video is the same.

Moreover, the video screen 41 is also employed for designating a placement location for newly placing a stamp 44. In concrete terms, for example, a stamp 44 that is to be placed and its location for placement may be respectively designated by touch actuation upon one of the stamps 44 in the candidate region 42 and upon the video screen 41. Alternatively, the stamp 44 that is to be placed and its location for placement may be designated by dragging and dropping a stamp 44 in the comment candidate region 42 to an appropriate location upon the video screen 41. For example, the video screen 41 may be employed in a procedure of this type for designating placement of a new stamp 44 and its location for placement.

Yet further, the video screen 41 may be employed for associating stamps 44 with viewing conditions. In concrete terms, for example, the viewing conditions of the replay video when a stamp 44 is placed upon the video screen 41 may be associated with the stamp 44 that is positioned there. In other words, a stamp 44 that is placed in the replay video may be associated with the viewing conditions at the time it was placed. Incidentally, the viewing conditions of the replay video may be changed over in various ways, such as with a changeover button or the like. For example, the viewing conditions of the replay video may be changed over by touch actuation upon the video screen 41. In concrete terms, for example, shrinking or enlargement (i.e. change of the angle of field) of the subject (for example an object image OJ) may be implemented by pinch actuation or stretch actuation upon the video screen 41. Furthermore, changing over of the virtual camera or of the photographic direction may be implemented by a sliding operation corresponding to shifting in the horizontal direction or rotational shifting or the like with respect to the video screen 41. On the other hand, the viewing conditions associated with the stamp 44 are not limited to being those at the time of placement. For example, another opportunity may be prepared for specifying the viewing conditions. Alternatively, options corresponding to viewing conditions of various types (for example, photographic conditions of various types such as positions of the virtual camera of preset types that are set in advance, or the angle of field, or the like) may be prepared separately, and viewing conditions to be associated with the stamp 44 may be specified by selection from among those options. Even further, any desired viewing conditions to be associated with the stamp 44 may be inputted by the user U.

On the other hand, the viewing control region 43 is a region for controlling viewing of the replay video that is being displayed via the video screen 41. In concrete terms, the viewing control region 43 includes a replay button 50, a fast forward button 51, a rewind button 52, and a comment control button 53. The fast forward button 51 and the rewind button 52 are buttons respectively for fast forwarding or for rewinding the replay video that is being displayed via the video screen 41. In a similar manner, the replay button 50 is a button for replaying or for stopping the replay video. For example, the replay button 50 may function as a stop button during replaying, and as a replay button during stopping, respectively. Moreover, the procedure described above of designating a placement location where the comment icon 46 is to be placed and so on may, for example, be executed while replaying of the replay video is stopped. As a result, the replay button 50 may function as a placing button for placing the stamp 44. On the other hand, the comment control button 53 is a button for controlling whether or not the comment is to be displayed.

In the example of FIG. 4, the video screen 41 is shown in a state in which a replay video is being replayed on the basis of one virtual camera A (not shown in the figure) among a plurality of virtual cameras. For this reason, the replay button 50 is displayed so as to illustrate its function as a stop button. In a similar manner, the comment control button 53 is displayed in the state in which comments are displayed. Due to this, three stamps 44 are displayed upon the video screen 41, corresponding to the viewing conditions from the virtual camera A. Along with change of the viewing conditions, these stamps 44 are automatically displayed as appropriate. Furthermore, a viewing information field 54 is attached to one stamp 44 among them. The viewing information field 54 is a region for displaying information upon the video screen 41 specifying the viewing conditions associated with each of the stamps 44. In concrete terms, the information "comment for camera A" is displayed in the viewing information field 54. The comment attachment service may, for example, be supplied via a comment screen 40 of this type.

Figure 5:
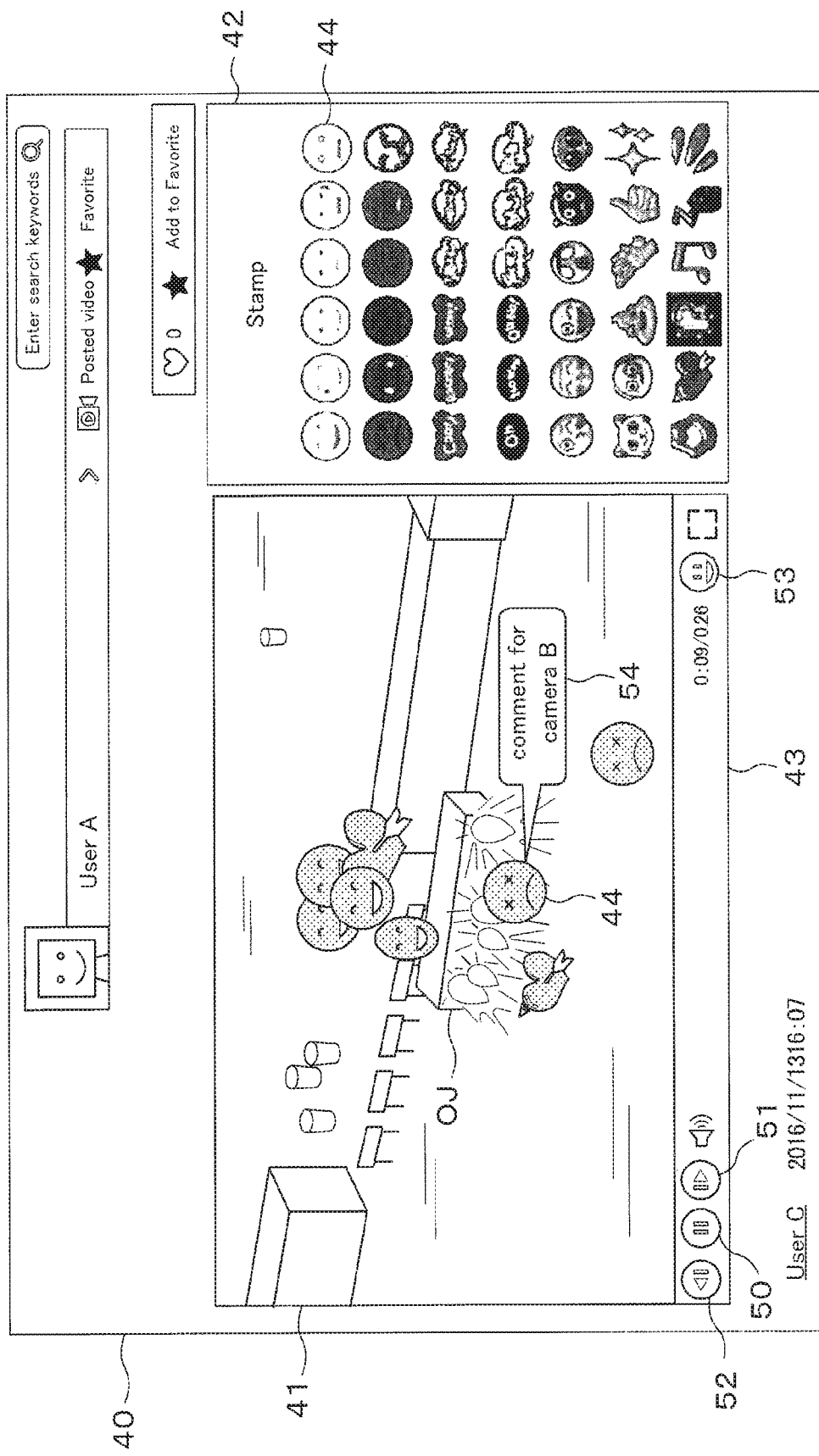
FIG. 5 is a figure schematically showing an example of a comment screen when viewing conditions for the replay video of the example of FIG. 4 have been modified.

FIG. 5 is a figure schematically showing an example of a comment screen when the viewing conditions for a replay video have changed in the example of FIG. 4. The example of FIG. 5 shows a case in which the replay video is being displayed upon the video screen 41 on the basis of the result of photography by a virtual camera B (not shown in the figures) that is disposed on the left side of the object image OJ in the example of FIG. 4. In other words, the example of FIG. 5 shows a comment screen 40 when the viewing conditions for the replay video showing the same scene as FIG. 4 (i.e. at the same time point) have been switched from the virtual camera A to the virtual camera B. In this case, as shown in FIG. 5, the display angle of the object image OJ on the video screen 41 changes. In concrete terms, in the FIG. 4 example, the object image OJ is displayed for a case in which this object in the game is photographed from the side, whereas in the example of FIG. 5 the object image OJ is displayed for the case in which the same object is photographed from the front. In this case, the object image OJ and the virtual cameras function as the displayed object of the present invention and as the points of view of the present invention.

Furthermore, along with this type of changeover of display angle, the stamp 44 displayed upon the video screen 41 is also changed over. In concrete terms, three stamps 44 are displayed on the video screen 41 in the example of FIG. 4, but seven stamps 44 are displayed in the example of FIG. 5. Moreover, their details are also changed from looks showing expressions of surprise in the example of FIG. 4, to looks showing expressions of sadness and joy. In other words, the stamps 44 that are displayed upon the video screen 41 are changed over from the stamps 44 associated with the virtual camera A in the FIG. 4 example to stamps 44 that are associated with the virtual camera B. In more concrete terms, for example, if each of the stamps 44 is associated with the viewing conditions at the time it was placed, then the video screen 41 changes over the stamps 44 that are subjects of display, so that the stamps 44 are displayed under the viewing conditions at the time they were placed. And the contents of the viewing information field 54 are also changed to information describing viewing conditions of this type ("comment for camera B"). The stamps 44 (i.e. comments) displayed upon the video screen 41 (the replay video) of the comment screen 40 are changed over according to the viewing conditions of the replay video in this manner.

Figure 6:
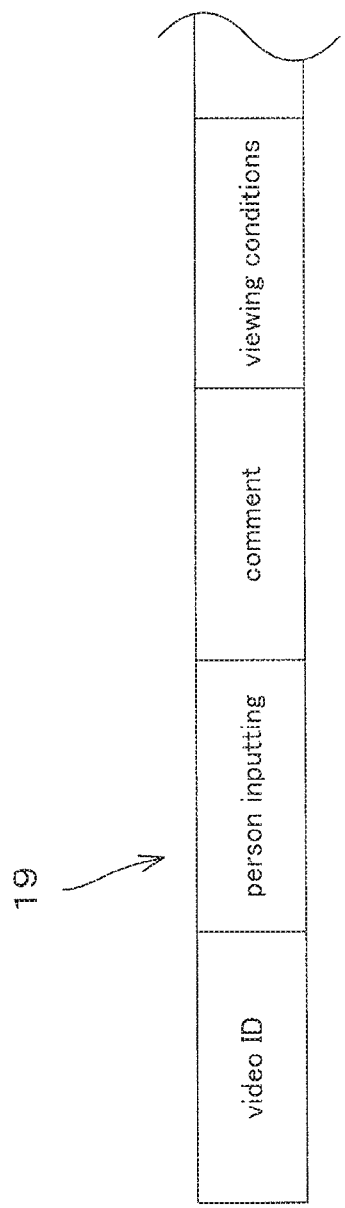
FIG. 6 is an explanatory figure for explanation of an example of contents of comment data.

Next, the details of the comment data 19 will be explained. FIG. 6 is an explanatory figure for explaining an example of the contents of the comment data 19. Moreover, the example of FIG. 6 shows a case in which the comment data 19 are employed for attachment of comments to a replay video. In this case, as shown in FIG. 6, the comment data 19 may for example include the information items "video ID", "person inputting", "comment", and "viewing conditions". And the comment data 19 may, for example, consist of a set of records that are structured so that these information items are mutually associated.

"Video ID" is an information item for identifying each video (including replay videos). Information specifying a unique video ID for each video may, for example, be employed as "video ID". "person inputting" is an information item specifying the user U who has inputted the comment that is attached to the video. For example, information specifying the user ID corresponding to the user U who has inputted each comment may be employed as the information item "person inputting". And "comment" is an information item specifying the contents of the comment attached to each video. For example, if stamps 44 are employed as comments, then unique stamp ID information for each stamp 44 may be described in "comment" for identifying each stamp 44. Furthermore, "comment" may also include information specifying the insertion position where each comment must be inserted into the video being replayed (for example, the elapsed time from the start of replaying, or the like). And, if each of the stamps 44 is placed upon the video screen 41, then "comment" may also include information specifying the location for this placement.

"Viewing conditions" is an information item specifying the viewing conditions according to which each comment is to be displayed in the replay video. For example, if the replay video is displayed on the basis of the results of photography by a plurality of virtual cameras of a preset type, then, as "viewing conditions", information specifying a unique camera ID for each virtual camera may be employed for identifying each virtual camera (for example "virtual camera A" and so on). Furthermore, if the photographic direction, the photographic angle, the angle of field, or the position of configuration are set for each virtual camera, then the information item "viewing conditions" may include information specifying this type of photographic direction and so on. Alternatively, if the photographic direction, the photographic angle, the angle of field, or the position of configuration of the virtual camera are set (i.e. are specified) as desired by the user U, then information specifying the parameters giving that position of configuration and so on may also be described as the information item "viewing conditions". Moreover, in this case, in order to avoid frequent alterations of the comments originating in slight discrepancies, parameters of this type may be formed into unit blocks of position of configuration or photographic direction or the like for each predetermined range for which it is decided that the visual impression will be the same. And information specifying blocks of this sort may be described as "viewing conditions".

Next, the comment generation processing and the comment delivery processing will be explained. The comment generation processing is processing for generating (including updating) comment data 19 corresponding to replay videos. For example, the comment generation processing may be executed in order to implement the process S3 or the process S4 of the example of FIG. 3. On the other hand, the comment delivery processing is processing for delivering comment data 19 corresponding to replay videos to user terminals 5. For example, the comment delivery processing may be executed in order to implement the process S2 of the example of FIG. 3.

Figure 7:
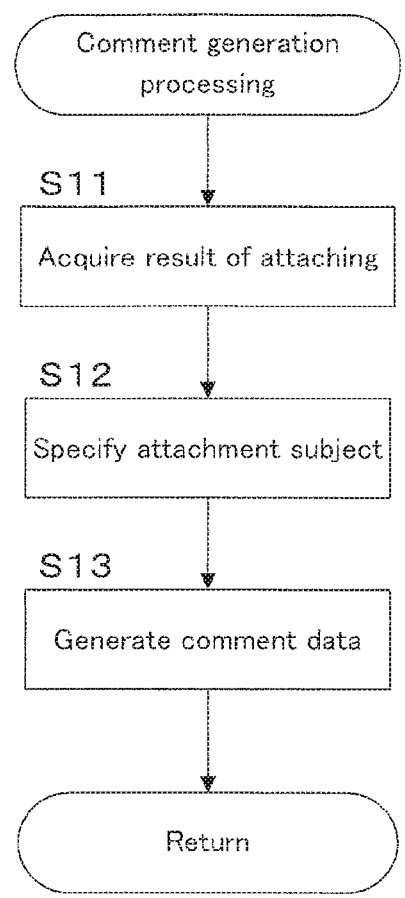
FIG. 7 is a figure showing an example of a flow chart of a comment generation processing routine.
Figure 8:
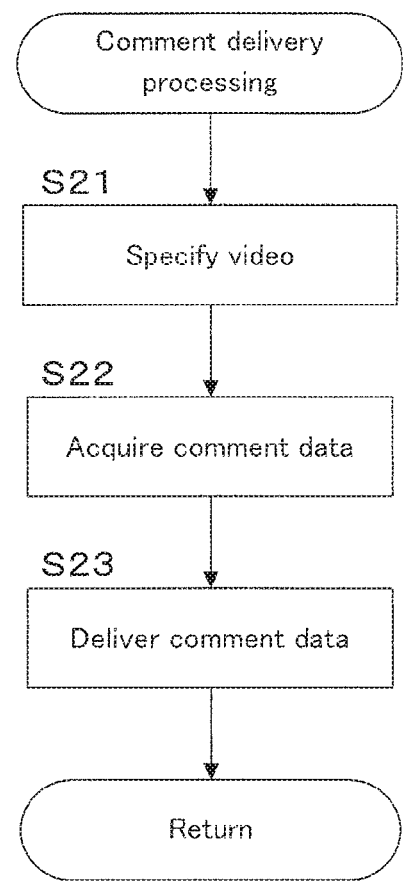
FIG. 8 is a figure showing an example of a flow chart of a comment delivery processing routine.

For example, the comment generation processing may be implemented by the control unit 10 of the central server 2 via the routine of FIG. 7, and the comment delivery processing may be implemented via the routine of FIG. 8, respectively. In more concrete terms, for example, the routines of FIG. 7 and FIG. 8 may be executed by the web service management unit 17 of the control unit 10. Incidentally, for example, the routine of FIG. 7 may be executed by the control unit 30 of a user terminal 5. Furthermore, apart from the above processing, the control unit 10 of the center server 2 and the control units 30 of the user terminals 5 may execute conventional processing and so on of various known types, either singly or in mutual cooperation. However detailed explanation thereof will be omitted.

FIG. 7 is a figure showing an example of a flow chart of a comment generation processing routine for implementing the comment generation processing. In more concrete terms, the example of FIG. 7 illustrates a flow chart when comment data 19 is generated by the center server 2. In this case, for example, the routine of FIG. 7 may be executed each time a comment attached to a replay video and information specifying viewing conditions to be associated with that comment are transmitted from a user terminal 5. Moreover, for example, each time placement of a stamp 44 is commanded via the comment screen 40, the user terminal 5 may transmit this placement result to the center server 2. For example, placement of a stamp 44 may be commanded when the stamp 44 is dragged and dropped to a specified position. And the user terminal 5 may transmit to the center server 2 information specifying the stamp 44 that has been dragged and dropped, the location where it has been dropped, the viewing conditions to be associated with that stamp 44, and the video that is the subject.

When the routine of FIG. 7 is started, first in a step S11, on the basis of the contents transmitted by the user terminal 5, the web service management unit 17 acquires the result of attaching the comment to the replay video. In concrete terms, for example, the web service management unit 17 may acquire information specifying the stamp 44 that has been dragged and dropped, the location at which it has been dropped, the viewing conditions to be associated with that stamp 44, and the video to which these are to be attached, as an attachment result included in the contents transmitted by the user terminal 5.

In the next step S12, the web service management unit 17 specifies the attachment subject for the attachment result acquired in the step S11. In other words, the web service management unit 17 specifies the replay video to which the stamp 44 acquired in the step S11 is to be attached. In concrete terms, for example, the web service management unit 17 may specify the replay video that is to be the subject of attachment on the basis of information specifying the video to be the attachment subject acquired in the step S11.

In the next step S13, the web service management unit 17 generates (this includes updating) comment data 19 on the basis of the result of acquisition in the step S11 and the specification result in the step S12. In concrete terms, for example, the web service management unit 17 may generate comment data 19 that associate the stamp 44 that was acquired in the step S11, its position of placement, and the viewing conditions, with the video ID corresponding to the replay video specified in the step S12. In other words, in the step S13, the web service management unit 17 may generate comment data 19 including a record in which these information items are described so as to be mutually associated with each other. And, after the processing of the step S13 has been completed, the web service management unit 17 terminates this iteration of the routine.

According to the routine of FIG. 7, comments attached to each of the replay videos and the viewing conditions for displaying these comments are managed by the center server 2. In more concrete terms, comment data 19 is generated that include information specifying the stamps 44 to be placed in the display region of each replay video, the locations in which they are to be placed, and the viewing conditions according to which they are to be displayed. As a result, for example, the process of S3 or S4 in the example of FIG. 3 is implemented.

On the other hand, FIG. 8 is a figure showing an example of a flow chart of a comment delivery processing routine for implementing the comment delivery processing. The routine of FIG. 8 may, for example, be executed each time delivery of a video is requested from a user terminal 5. When the routine of FIG. 8 is started, first in a step S21, the web service management unit 17 specifies the replay video that is the subject of the request.

In the next step S22, the web service management unit 17 acquires the comment data 19. In concrete terms, first, on the basis of the information item "video ID", the web service management unit 17 specifies the comment data 19 corresponding to the replay video that was specified in the step S21. This specification is performed so that the comment data 19 includes information for the comment corresponding to the viewing conditions of the replay video when it was being viewed. And then the web service management unit 17 acquires this comment data 19 that has been specified. For example, specification and acquisition of this sort may be performed by units of insertion position on the basis of information specifying its position for insertion, so that, when replaying (viewing) is started during delivery of the replay data (i.e. when so called streaming delivery is being performed), the comment is inserted in an appropriate manner into the replay video while it is being replayed.

And, in the next step S23, the web service management unit 17 delivers (i.e. supplies) comment data 19 corresponding to the requested replay video to the user terminal 5. In other words, the web service management unit 17 supplies comment data 19 to the user terminal 5 so that the comment, which has been inserted into the replay video, is displayed in an appropriate manner according to the viewing conditions at the time of viewing. In concrete terms, for example, the web service management unit 17 may deliver the comment data 19 specified in the step S22 to the user terminal 5, so that the stamp 44 is displayed according to the viewing conditions when it is placed in the replay video in an appropriate placement location. And, after the processing of the step S23 has been completed, the web service management unit 17 terminates this iteration of the routine.

According to the routine of FIG. 8, information is supplied to the user terminal 5 specifying the comment to be attached to the replay video and the viewing conditions according to which that comment is to be displayed. In concrete terms, information is supplied to the user terminal 5 specifying the stamp 44 to be displayed in the replay video that is the subject of the request, the position where it is to be placed, and its viewing conditions. And, on the basis of this information, each stamp 44 is displayed in the replay video according to the appropriate viewing conditions. In other words, in order for the stamp 44 that is the subject of display according to changeover of the viewing conditions to be changed over in an appropriate manner, comment data 19 that manages information for doing so is supplied to the user terminal 5. As a result, for example, the process of S2 of the example of FIG. 3 is implemented.

As explained above, according to this embodiment, each comment for the replay video is managed in association with its viewing conditions via the comment data 19. For example, when stamps 44 are employed as comments, then each stamp 44 of that type is managed in association with its viewing conditions. Moreover, along with delivery of replay data 18a for displaying a replay video, comment data 19 corresponding to that replay video is also delivered to the user terminal 5. And, on the basis of comment data 19 of that sort, the replay video is displayed so that the stamps 44 are changed over according to these changes of the viewing conditions. Due to this, when the replay video is delivered with the viewing conditions during viewing being changed according to the selection of each user U, it is possible to suppress display of stamps 44 that do not match the viewing conditions of the replay video currently being viewed.

In concrete terms, for example, even if along with change of the viewing conditions a stamp 44 is undesirably generated that does not agree with the intentions of the person doing the inputting, still it is possible to prevent reduction of the appeal of the replay video, since it is possible to change a stamp 44 of that type to non-display. Furthermore, since it is possible carefully to select the stamp 44 that is displayed in the replay video to be a stamp 44 that is matched to the viewing conditions, accordingly it is possible to anticipate that the appeal of the replay video will be enhanced.

Moreover, if for example the replay video corresponds to a game screen in a virtual three dimensional space, then sometimes it happens that changing over between virtual cameras may exert an influence upon either or both of the size of an object image OJ and its display angle. In other words, for example, the possibility is high that a changeover between virtual cameras, such as changing over of the result of photography from a virtual camera A to a virtual camera B, will exert an influence upon the details of display of an object image OJ. And the possibility is high that a change of display details of this sort will alter the impression given to the user U. Due to this, for example, if the virtual camera is employed as a viewing condition, then the stamps 44 are changed over on the basis of such a condition that the possibility is high that an influence will be exerted upon the impression given to the user U. Due to this, it is possible more appropriately to suppress the display of stamps 44 that do not match the viewing conditions of the replay video being viewed.

Furthermore, it is often the case that each stamp 44 reflects the impressions of the viewing conditions at the time of input. For this reason, it is very likely that the viewing conditions during input will match the impression of the person performing the inputting. As a result, if for example each stamp 44 is associated with the viewing conditions at the time it was inputted, then, since it is possible to manage the viewing conditions for which the possibility of this type is high that they match the impression of the person who performed the inputting in association with each stamp 44, accordingly it is likewise possible more appropriately to suppress display of stamps 44 that do not match the viewing conditions of the replay video during viewing. Moreover, it is possible to reduce the work imposed upon the user U, as compared with a case in which the viewing conditions must be specified separately.

In the embodiment described above, by performing the routine of FIG. 8, the control unit 10 of the center server 2 functions as the data supply unit of the present invention. On the other hand, by storing the video data 18 including the replay data 18a, and also the comment data 19, the storage unit 11 of the center server 2 functions as the video data storage unit of the present invention and as the comment data storage unit of the present invention.

The present invention is not limited to the embodiment described above; it may be varied as appropriate. For example, in the embodiment described above, the comment data 19 is managed separately from the video data 18. However, the present invention is not limited to this type of format. For example, the video data 18 may function as a part of the comment data 19. In other words, the comments and the viewing conditions attached to each replay video may be managed as a part of the video data 18.

In the embodiment described above, a replay video was employed as the video for which the viewing conditions are changed. However, the video to be delivered according to the present invention is not limited to being a video of this type. Videos of various types whose viewing conditions are changed may be employed as videos to be subjects for distribution. In concrete terms, for example, videos of various types, such as for example a video corresponding to video photography of areal space for which the viewing conditions can be selected, or a video corresponding to an animation and so on, may be employed as videos to be subjects for distribution according to the present invention.

Furthermore, in the embodiment described above, the replay data 18a is employed by a game application. However, the present invention is not limited to a format of this sort. For example, various types of video data for displaying videos of various types whose viewing conditions can be changed may be employed by applications of various types. Or, for example, if game machines for business use (i.e. for commercial use) that enable users to play games within a predetermined range for payment or without payment, and that thus serve as game terminals, are connected to the center server 2 via the network 3, then video data of various types such as replay data 18a and so on may be employed by game terminals of this sort.

In the following, examples of the present invention are described that are obtained from the details described above. Incidentally, in order to facilitate understanding of the present invention, reference symbols in parentheses that refer to the appended figures are supplemented in the following explanation, but the present invention is not thereby to be considered as being limited to the embodiments shown in the figures.

The server device of the present invention is a server device (2) that comprises a computer (10) having a video data storage unit (11) that stores video data (18a) for displaying videos, and that, when a video display terminal (5) that displays a video on the basis of the video data is connected via a network (3), delivers the video data to the video display terminal according to a request by the video display terminal, and wherein the computer serves as: a comment data storage unit (11) that, if the video data is structured so that viewing conditions for changing display state of an object included in the video are changed during viewing of the video according to selection by each user, stores comment data (19) in which information specifying comments (44) attached to the video by users and information specifying the viewing conditions according to which the comments are to be displayed are described in mutual association; and a data supply unit (10) that, when the video data is delivered, supplies to the video display terminal the comment data including information specifying the comments corresponding to the viewing conditions for the video at the time of viewing, so that the comments displayed in the video are changed over according to change of the viewing conditions.

According to the present invention, when the viewing conditions for changing the display state of the object included in the video are changed during viewing of the video according to selection by each user, the comments are managed in association with the viewing conditions via the comment data. Moreover, along with delivery of video data of this sort for displaying the video, comment data is also delivered to the user terminal. And, on the basis of comment data of this sort, the video is displayed so that the comments are changed over according to change of the viewing conditions. Due to this, it is possible to suppress the display of comments that do not match the viewing conditions of the video that is being viewed. In concrete terms, for example, it is possible to suppress reduction of the appeal of the video since, even if, along with a change of the viewing conditions, a comment that differs from the intention of the person who inputted it is undesirably generated, still it is possible to hide the display of comments of this type. Furthermore, since it is possible to select very carefully only comments that match the viewing conditions as being comments to be displayed in the video, accordingly it is also possible to anticipate enhancement of the appeal of the video.

The display state of the object may change in various ways. For example, in one aspect of the server device of the present invention, as the display state, the viewing conditions may enable change of at least one of size, display angle, and position of the displayed object.

As the viewing conditions, conditions of various types may be employed for changing the size of a displayed object or the like. For example, if the video data is structured so as to display the video on the basis of the result of photography by a camera (including a virtual camera that photographs a virtual space), then the photographic direction, the photographic angle, the angle of field, the position of placement, and so on of such a camera may be employed as viewing conditions. Alternatively, if a plurality of cameras of this type (examples of points of view) are prepared, then each camera may be employed as a set of viewing conditions. In concrete terms, for example, in one aspect of the server device of the present invention, if the video data is structured so as to enable change of the display angle of the surface of the object on the basis of a plurality of points of view, then, as the viewing conditions, information specifying the points of view may be described in the comment data. Changing over the point of view of course exerts an influence upon one or the other of the size and the display angle of the displayed object, and sometimes also may exert an influence upon both of them. In other words, there is a high possibility that changing over the point of view will exert an influence upon the details of the displayed object. And there is a high possibility that change of the display details of this sort will exert a change upon the impression given to the user U. In the case of this aspect of the present invention, the comments are changed over on the basis of such conditions for which the possibility is high that they will exert an influence upon the impression given to the user. Due to this, it is possible to suppress in a more appropriate manner display of comments that do not match the viewing conditions of the video being viewed.

The video data may display videos of various types in which the viewing conditions are changed during viewing of the videos according to selection by each of the users. For example, video photography of a real space for which the viewing conditions can be selected may be employed for this sort of video, or alternatively an animation may also be employed. For example, in one aspect of the server device of the present invention, if the video display terminal also functions as a game terminal (5) that provides a game, then the video data may function as replay data (18a) for displaying a replay video that replays past playing of the game, so that the replay video is employed as the video.

Viewing conditions of various types may be managed with the comment data. For example, viewing conditions that are designated separately by the users when a comment is inputted or at some different opportunity may be managed. In a similar manner, for example, according to one aspect of the server device of the present invention, if the comments are inputted during viewing of the video, then information specifying the viewing conditions when the comments were inputted may be described in the comment data so as to be associated with the comments. It is often the case that each comment reflects the impression of the viewing conditions at the time of input. Due to this, the possibility is high that the viewing conditions during input will match the impression of the person doing the inputting. Since, in this aspect of the present invention, it is possible to manage such viewing conditions for which the possibility is high that they match the impressions of the person who inputted them in association with the comments, accordingly it is possible to prevent display of comments that do not match the viewing conditions of the video being viewed in a more appropriate manner. Furthermore it is possible to reduce the amount of work for the user, as compared to the case in which the viewing conditions are specified separately.

On the other hand, a non-transitory computer readable storage medium according to the present invention is a non-transitory computer readable storage medium storing a computer program that is adapted to cause the computer (10) having the video data storage unit and the comment data storage unit to function as the units of the server device described above. By executing the computer program of the present invention, it is possible to implement the server device of the present invention.

The invention claimed is:

1. A server device that comprises a computer having a video data storage that stores video data for displaying videos, and that, when a video display terminal that displays a video based on the video data is connected via a network, delivers the video data to the video display terminal according to a request by the video display terminal, and wherein the computer is configured to:
   when the video data is structured so that viewing conditions for changing a display state of an object included in a video display region displayed on the video display terminal as a part of the video are changed during viewing of the video according to a selection by each user, store comment data in which information specifying comments attached to the video by users and information specifying the viewing conditions according to which the comments are to be displayed are described in mutual association; and
   when the video data is delivered, supply, to the video display terminal, the comment data including information specifying the comments corresponding to the viewing conditions for the video at the time of viewing, so that the comments displayed in the video are changed according to a change of the viewing conditions even though a position of the object in the video display region is not changed.

2. The server device according to claim 1, wherein, as the display state, the viewing conditions enable change of at least one of a size, a display angle, and a position of the object.

3. The server device according to claim 2, wherein, when the video data is structured so as to enable change of the display angle of a surface of the object based on a plurality of points of view, as the viewing conditions, information specifying the points of view is described in the comment data.

4. The server device according to claim 1, wherein, when the video display terminal comprises a game terminal that provides a game,
   the video data comprises replay data for displaying a replay video that replays a past playing of the game, and
   the video comprises the replay video.

5. The server device according to claim 1, wherein, when the comments are inputted during viewing of the video, information specifying the viewing conditions when the comments were inputted is described in the comment data so as to be associated with the comments.

6. A non-transitory computer readable storage medium storing a computer program that, when accessed and executed by a computer having a video data storage that stores video data for displaying videos, and that, when a video display terminal that displays a video based on the video data is connected via a network, delivers the video data to the video display terminal according to a request by the video display terminal, causes the computer to:
   when the video data is structured so that viewing conditions for changing a display state of an object included in a video display region displayed on the video display terminal as a part of the video are changed during viewing of the video according to a selection by each user, store comment data in which information specifying comments attached to the video by users and information specifying the viewing conditions according to which the comments are to be displayed are described in mutual association; and
   when the video data is delivered, supply, to the video display terminal, the comment data including information specifying the comments corresponding to the viewing conditions for the video at the time of viewing, so that the comments displayed in the video are changed according to a change of the viewing conditions even though a position of the object in the video display region is not changed.

7. A server device comprising:
   a storage that stores video data for displaying videos, and that, when a video display terminal that displays a video based on the video data is connected via a network, delivers the video data to the video display terminal according to a request by the video display terminal, and when the video data is structured so that viewing conditions for changing a display state of an object included in a video display region displayed on the video display terminal as a part of the video are changed during viewing of the video according to a selection by each user, stores comment data in which information specifying comments attached to the video by users and information specifying the viewing conditions according to which the comments are to be displayed are described in mutual association; and
   at least one microprocessor that, when the video data is delivered, supplies, to the video display terminal, the comment data including information specifying the comments corresponding to the viewing conditions for the video at the time of viewing, so that the comments displayed in the video are changed according to a change of the viewing conditions even though a position of the object in the video display region is not changed.

8. The server device according to claim 7, wherein the display state comprises at least one of a size, a display angle, and a position of the object.

9. The server device according to claim 8, wherein the display state is the display angle of a surface of the object based on a plurality of points of view, and
the comment data comprises information specifying the plurality of points of view.

10. The server device according to claim 7, wherein, the video display terminal comprises a game terminal that provides a game,
the video data comprises replay data for displaying a replay video that replays a past playing of the game, and
the video comprises the replay video.

11. The server device according to claim 7, wherein, when the comments are inputted during viewing of the video, the comment data comprises information specifying the viewing conditions when the comments were inputted so as to be associated with the comments.

12. The server device according to claim 7, wherein the storage comprises:
a video data storage that stores the video data for displaying the videos; and
a comment data storage that stores the comment data in which the information specifying the comments attached to the video by the users and the information specifying the viewing conditions according to which the comments are to be displayed are described in mutual association.

* * * * *